United States Patent
Stephens et al.

(10) Patent No.: US 6,587,261 B1
(45) Date of Patent: Jul. 1, 2003

(54) OPTICAL TRANSMISSION SYSTEMS INCLUDING OPTICAL AMPLIFIERS AND METHODS OF USE THEREIN

(75) Inventors: Thomas D. Stephens, Columbia, MD (US); Raymond Zanoni, Columbia, MD (US)

(73) Assignee: Corvis Corporation, Columbia, MD (US)

( * ) Notice: Subject to any disclaimer, the term of this patent is extended or adjusted under 35 U.S.C. 154(b) by 0 days.

(21) Appl. No.: 09/316,995

(22) Filed: May 24, 1999

(51) Int. Cl.[7] .............................. H01S 3/00; G01N 21/00
(52) U.S. Cl. ...................... 359/337; 359/341.4; 356/72
(58) Field of Search .............................. 359/337, 341.3, 359/341.1, 341.4, 337.11; 356/72, 73.1

(56) References Cited

U.S. PATENT DOCUMENTS

| | | | |
|---|---|---|---|
| 5,703,711 A | | 12/1997 | Hamada |
| 5,861,980 A | * | 1/1999 | Ono .............................. 359/341 |
| 5,917,649 A | * | 6/1999 | Mori et al. ................. 359/341 |
| 6,016,213 A | * | 1/2000 | Farber et al. ............... 359/177 |
| 6,320,884 B1 | * | 11/2001 | Kerfoot, III et al. ............. 372/3 |

FOREIGN PATENT DOCUMENTS

EP 0762569 A2 3/1997

OTHER PUBLICATIONS

Horiguchi, M., et al., Erbium–Doped Optical Fiber Amplifiers Pumped in the 600–and 820–NMBANDS, Journal of Lightwave Technology, 1st May 1994, vol. 12, No. 5., pp. 810–820, New York, NY, USA, IEEE Log No. 9213686, ISSN 0733–8724.

* cited by examiner

Primary Examiner—Mark Hellner (57) ABSTRACT

Optical transmission systems of the present invention include at least one optical amplifier configured to provide optical amplification of one or more information carrying optical signal wavelengths. At least one optical amplifier is controlled based on an in situ performance characterization of the at least one optical amplifier and the transmission fiber. The in situ, or installed, performance characteristics of the optical amplifier can be characterized based on relative gain measurements over the signal wavelength range as a function of the supplied pump power. The installed characterization allows the optical amplifier performance and gain profiles to be tightly controlled over the signal wavelength range in the transmission system.

24 Claims, 7 Drawing Sheets

OPTICAL TRANSMISSION SYSTEMS INCLUDING OPTICAL AMPLIFIERS AND METHODS OF USE THEREIN

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention is directed generally to optical transmission systems. More particularly, the invention is directed toward optical transmission systems including in situ characterized and calibrated optical amplifiers.

Digital technology has provided electronic access to vast amounts of information. The increased access has driven demand for faster and higher capacity electronic information processing equipment (computers) and transmission networks and systems to link the processing equipment.

In response to this demand, communications service providers have turned to optical communication systems, which have the capability to provide substantially larger information transmission capacities than traditional electrical communication systems. Information can be transported through optical systems in audio, video, data, or other signal format analogous to electrical systems. Likewise, optical systems can be used in telephone, cable television, LAN, WAN, and MAN systems, as well as other communication systems.

Early optical transmission systems, known as space division multiplex (SDM) systems, transmitted one information signal using a single wavelength in separate waveguides, i.e. fiber optic strand. The transmission capacity of optical systems was increased by time division multiplexing (TDM) multiple low bit rate, information signals into a higher bit rate signals that can be transported on a single optical wavelength. The low bit rate information carried by the TDM optical signal can then be separated from the higher bit rate signal following transmission through the optical system.

The continued growth in traditional communications systems and the emergence of the Internet as a means for accessing data has further accelerated the demand for higher capacity communications networks. Telecommunications service providers, in particular, have looked to wavelength division multiplexing (WDM) to further increase the capacity of their existing systems.

In WDM transmission systems, pluralities of distinct TDM or SDM information signals are carried using electromagnetic waves having different wavelengths in the optical spectrum, i.e., far-UV to far-infrared. The pluralities of information carrying wavelengths are combined into a multiple wavelength WDM optical signal that is transmitted in a single waveguide. In this manner, WDM systems can increase the transmission capacity of existing SDM/TDM systems by a factor equal to the number of wavelengths used in the WDM system.

Optical WDM systems were not initially deployed, in part, because of the high cost of electrical signal regeneration/amplification equipment required to compensate for signal attenuation for each optical wavelength throughout the system. The development of the erbium doped fiber optical amplifier (EDFA) provided a cost effective means to optically regenerate attenuated optical signal wavelengths in the 1550 nm range. In addition, the 1550 nm signal wavelength range coincides with a low loss transmission window in silica based optical fibers, which allowed EDFAs to be spaced further apart than conventional electrical regenerators.

The use of EDFAs essentially eliminated the need for, and the associated costs of, electrical signal regeneration/amplification equipment to compensate for signal attenuation in many systems. The dramatic reduction in the number of electrical regenerators in the systems, made the installation of WDM systems in the remaining electrical regenerators a cost effective means to increase optical network capacity.

WDM systems have quickly expanded to fill the limited amplifier bandwidth of EDFAs. New erbium-based fiber amplifiers (L-band) have been developed to expand the bandwidth of erbium-based optical amplifiers. Also, new transmission fiber designs are being developed to provide for lower loss transmission in the 1400–1500 nm and 1600–1700 nm ranges to provide additional capacity for future systems.

Raman fiber amplifiers ("RFA") are also being investigated for use in wide bandwidth, e.g., 100 nm, optical amplifiers. RFAs are well known, but have not been deployed in commercial systems because significant pump powers on the order of hundreds of milliwatts are required to achieve relatively small levels of amplification. In addition, the RFAs that were developed did not provide a flat gain profile and thus encountered the same limitations as EDFAs. See Rottwitt et al., "A 92 nm Bandwidth Raman Amplifier", OFC '98, p. 72/CAT-1. Despite the negatives, RFAs provide have appeal as a viable option for next generation optical amplifiers, because RFAs provide low noise, wide bandwidths, and wavelength flexible gain.

Applicants, along with co-inventors, have demonstrated that RFAs can be designed to provide controllable Raman gain profiles over arbitrary bandwidths. Raman amplifiers embodying the Applicant's invention are described commonly assigned U.S. patent application Ser. Nos. 09/119,556 and 09/253,819, which are incorporated herein by reference. The RFAs can be deployed in existing fiber optic networks having various fiber designs and compositions and over a wide range of signal wavelengths.

Recent theoretical analyses by Rottwitt et al. have confirmed Applicant's invention that multiple pump wavelengths can be used to provide a substantially flat Raman gain profile in a silica fiber over wide bandwidths. The laboratory testing and theoretical simulation results enabled a substantial decrease in the variations in the gain profile observed in their earlier studies. See Kidorf et al, "Pump Interactions in a 100-nm Bandwidth Raman Amplifier", IEEE Photonics Technology Letters, Vol. 11, No. 5, pp. 530-2 (May 1999).

While laboratory and simulation testing is helpful, the actual performance of RFAs will generally vary depending upon the in-line, or in situ, condition of the transmission fiber, particularly for distributed and remote amplifiers. Therefore, the actual performance of the amplifiers and the transmission system can not be characterized before the deployment and operation of the system. Unfortunately, the development of optical systems having increased capacity and longer transmission distances depends on having a well characterized and controlled transmission system. It is, therefore, essential that optical systems and optical amplifiers be developed having in situ characterization and control capabilities to meet the requirements of next generation optical systems.

BRIEF SUMMARY OF THE INVENTION

The apparatuses and methods of the present invention address the above need for improved optical transmission systems and optical amplifiers. Optical transmission systems of the present invention include at least one optical amplifier configured to provide optical amplification of one or more information carrying optical signal wavelengths. The performance of the at least one optical amplifier is based on an in-line characterization of the at least one optical amplifier and the transmission fiber. The in situ, or installed/on-line, performance characteristics of the optical amplifier can be determined by measuring the relative gain at signal wavelength as a function of the supplied pump power. The installed characterization of the optical amplifier performance allows the gain profile to be tightly controlled in the transmission system.

In various embodiments, broad band test power corresponding to the entire signal wavelength range, or subsections thereof, is transmitted through the in situ transmission fiber for use in characterizing the amplifier. The test power can be provided by a broad or narrow band noise sources, such as an amplified spontaneous noise "ASE" source, or by one or more narrow band sources at the one or more of the signal wavelengths.

The test power can also be provided using optical transmitters in the optical system or dedicated fixed or tunable, narrow or broad band test sources. The test power in the signal wavelengths can be measured following the amplifier using an optical to electrical converter, such as an optical spectrum analyzer or one or more fixed or tunable optical receivers.

Measurements can be taken of the test power exiting the amplifier when it is pumped with different combinations of the pump wavelengths supplying various zero and non-zero amounts of pump power. The power measurements can then be used to determine amplifier performance parameters, such as gain efficiency and pump interaction parameters. The functionality of the amplifier parameters can be modeled to include various effects, such as pump power level, signal wavelength density, etc., as may be appropriate.

In various embodiments, RFAs can be generally characterized by assuming the gain pumping efficiency and pump interactions parameters are independent of pump power and signal wavelength density over the wavelength range of interest. Whereas, it may be necessary to include a pump power dependence in the amplifier parameters for erbium or other doped fiber amplifiers depending upon the power range of interest.

Numerical or analytic solutions for the gain efficiencies and interaction parameters can be determined depending upon the modeling assumptions used in the characterization. Statistical procedures can also be used to reduce the number of measurements required to characterize the optical amplifier performance.

The calculated amplifier performance parameters can also be loaded into a network management system, including an amplifier central processor and used to control the gain profile of the amplifier. For example, if signal wavelengths being transmitted through the optical system are to be rerouted, new gain profiles can be sent from a network management layer of the system down to the various amplifiers. The central processors in the amplifiers can then be locally calculate and implement the pump power settings.

The in situ characterization of the amplifier performance provides increased control over optical systems including optical amplifiers. The present invention has particular utility for distributed or remotely located optical amplifiers. These amplifier designs can not be thoroughly characterized before installation as with discrete, lumped or concentrated amplifiers, because of the amplifier location combined with the use the installed transmission fiber as the amplifying fiber. For example, a remotely located section of erbium fiber can be characterized either alone or in combination with an RFA to provide an in situ characterization of the amplifier.

The optical amplifiers and transmission systems of the present invention provide the increased control, flexibility, and upgradability necessary for future optical transmission systems. These advantages and others will become apparent from the following detailed description.

BRIEF DESCRIPTION OF THE DRAWINGS

Embodiments of the present invention will now be described, by way of example only, with reference to the accompanying drawings for the purpose of illustrating present embodiments only and not for purposes of limiting the same, wherein like members bear like reference numerals and.

DETAILED DESCRIPTION OF THE INVENTION

Figure 1:
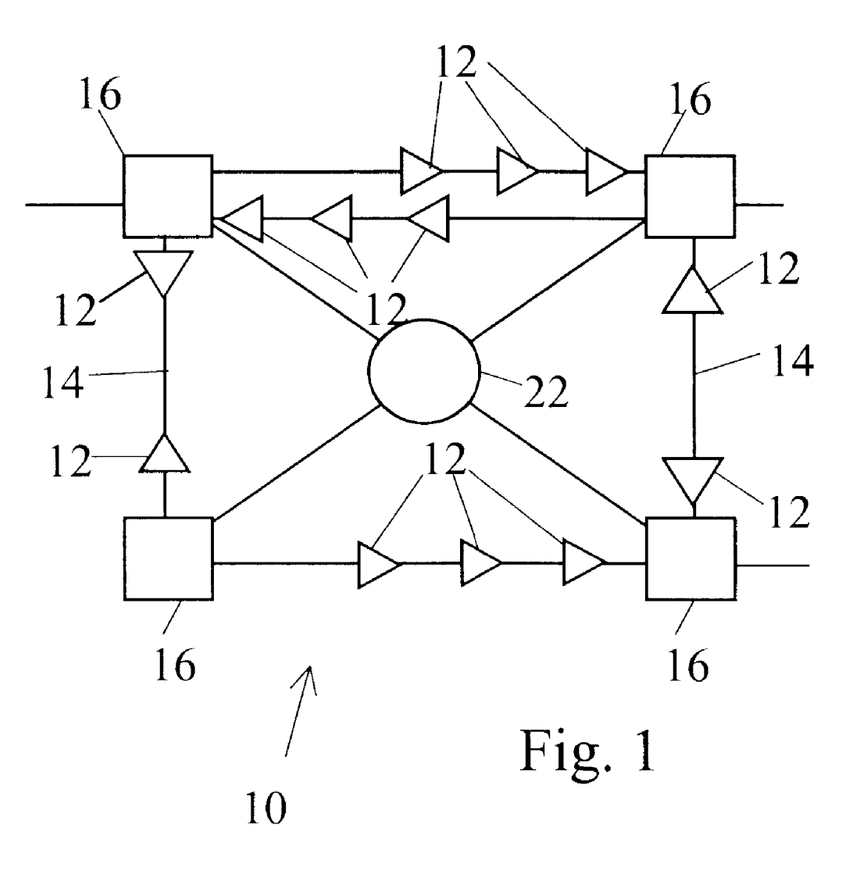
FIGS. 1 and 2 show optical system embodiments.
Figure 2:
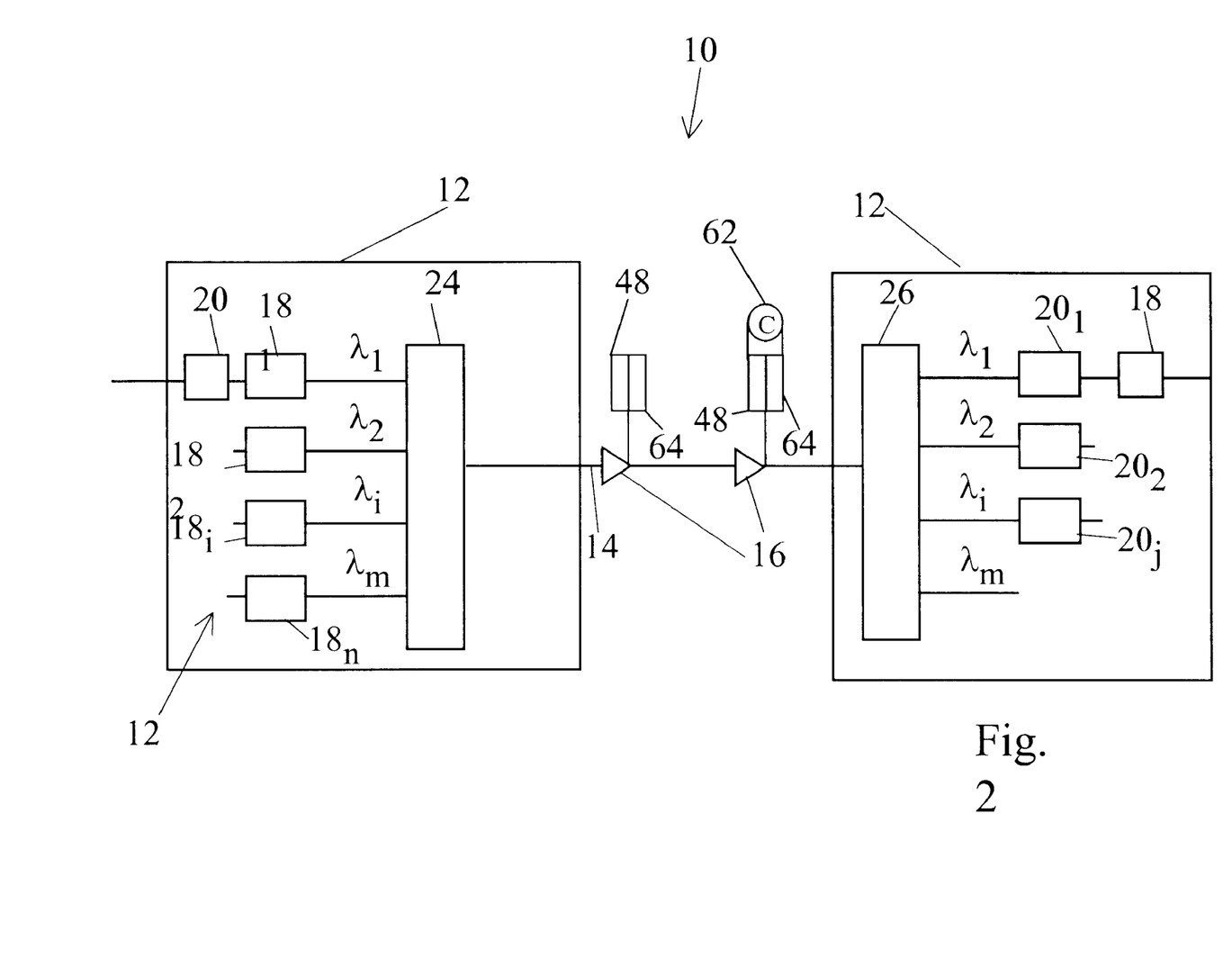

Optical systems 10 of the present invention include an optical amplifier 12 disposed along an optical transmission fiber 14 to optically amplify optical signals passing between optical processing nodes 16. One or more transmitters 18 can be included in the nodes 16 and configured to transmit information via the optical signals in one or more information carrying signal wavelengths, or signal channels, $\lambda_i$ to one or more optical receivers 20 in other nodes 16. The optical system 10 can be configured in multi-dimensional networks controlled by a network management system 22 (FIG. 1) or in one or more serially connected point to point links (FIG. 2).

The optical processing nodes 16 may also include other optical components, such as one or more add/drop devices and optical switches/routers/cross-connects interconnecting the transmitters 18 and receivers 20. For example, broadcast and/or wavelength reusable, add/drop devices, and optical and electrical/digital cross connect switches and routers can be configured via the network management system 22 in various topologies, i.e., rings, mesh, etc. to provide a desired network connectivity.

Signal wavelengths $\lambda_i$ can be combined using optical combiners 24 into WDM optical signals and transmitted through the fiber 14. The transmitters 18 can transmit the information using directly or externally modulated optical carrier sources or optical upconverters. Likewise, optical distributors 26 can be provided to distribute optical signals to the receivers 20, which can include both direct and coherent detection receivers. For example, N transmitters 18 can be used to transmit M different signal wavelengths to J different receivers 20. In various embodiments, one or more of the transmitters 18 and receivers 20 can be wavelength tunable to provide wavelength allocation flexibility in the optical system 10.

The optical combiners 24 and distributors 26 can include wavelength selective and non-selective ("passive") fiber and free space devices, as well as polarization sensitive devices. Passive or WDM couplers/splitters, circulators, dichroic devices, prisms, gratings, etc. can be used in combination with various tunable or fixed transmissive or reflective filters, such as Bragg gratings, Fabry-Perot devices, dichroic filters, etc. in various configurations of the optical combiners 24 and distributors 26. Furthermore, the combiners 24 and distributors 26 can include one or more stages incorporating various devices to multiplex, demultiplex, and broadcast signal wavelengths $\lambda_i$ in the optical systems 10.

Figure 3:
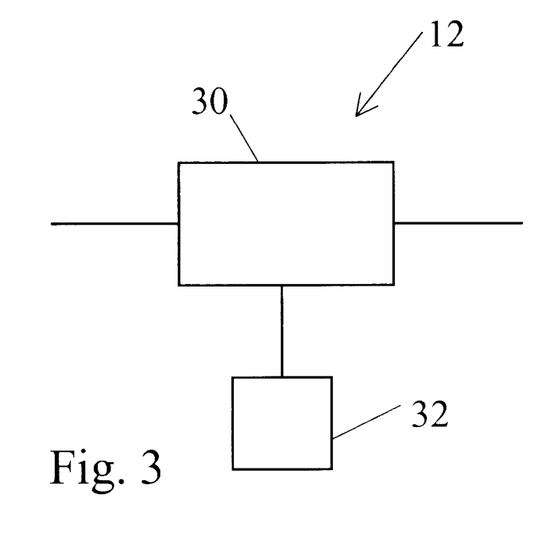
FIGS. 3 shows optical amplifier embodiments.
Figure 4:
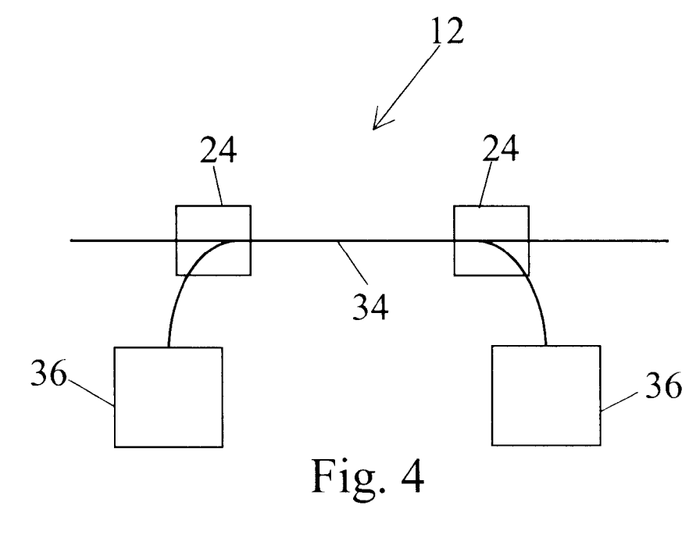
FIGS. 4–6 show optical amplifier and system embodiments.
Figure 5A:
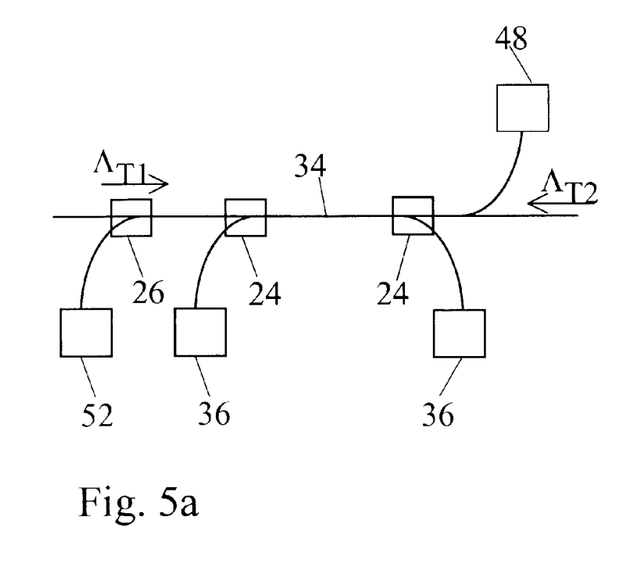
Figure 5B:
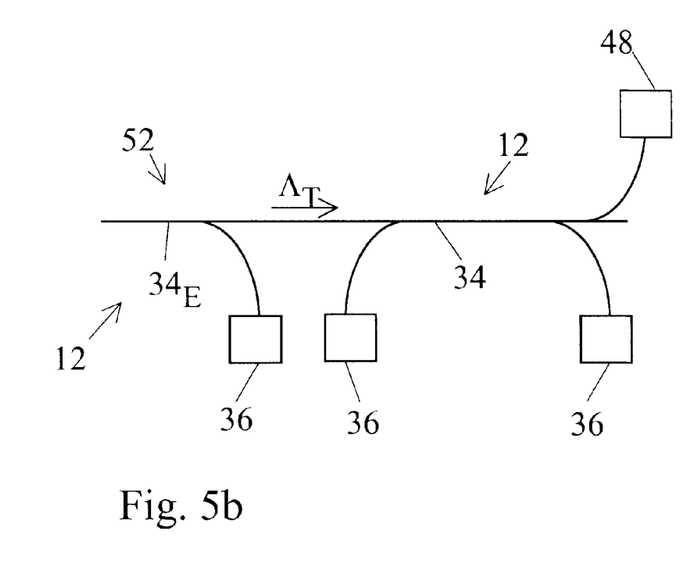
Figure 5C:
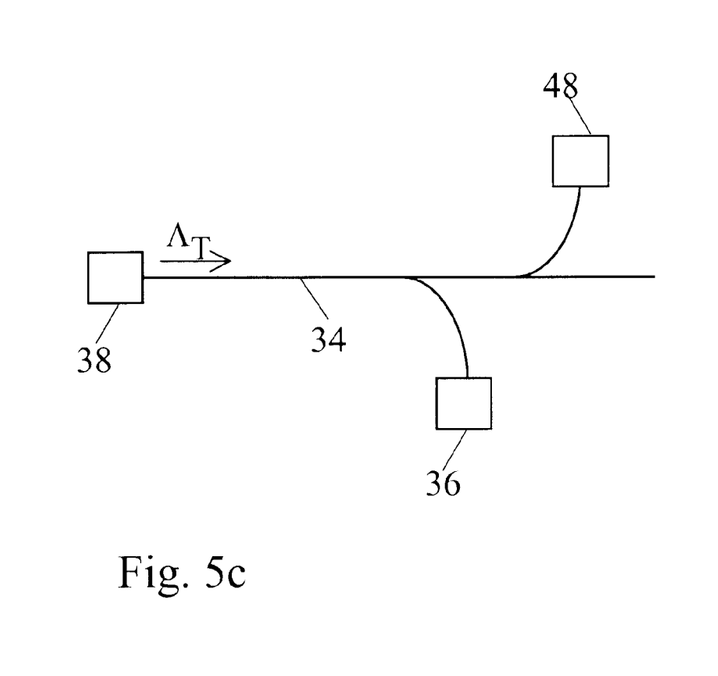
Figure 5D:
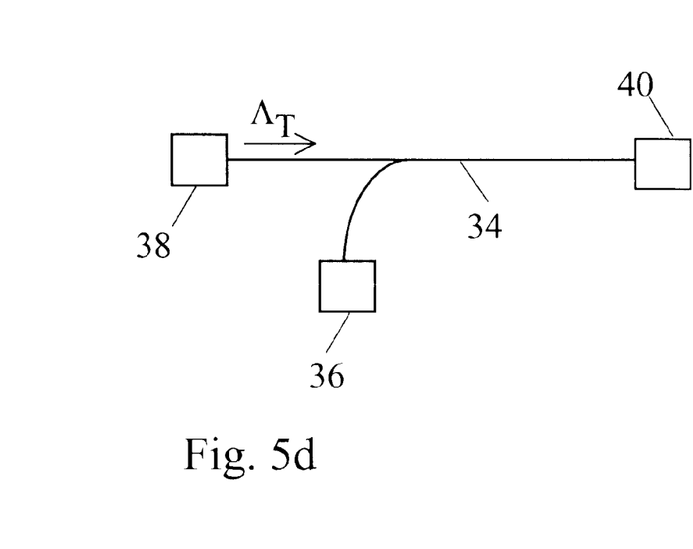
Figure 6:
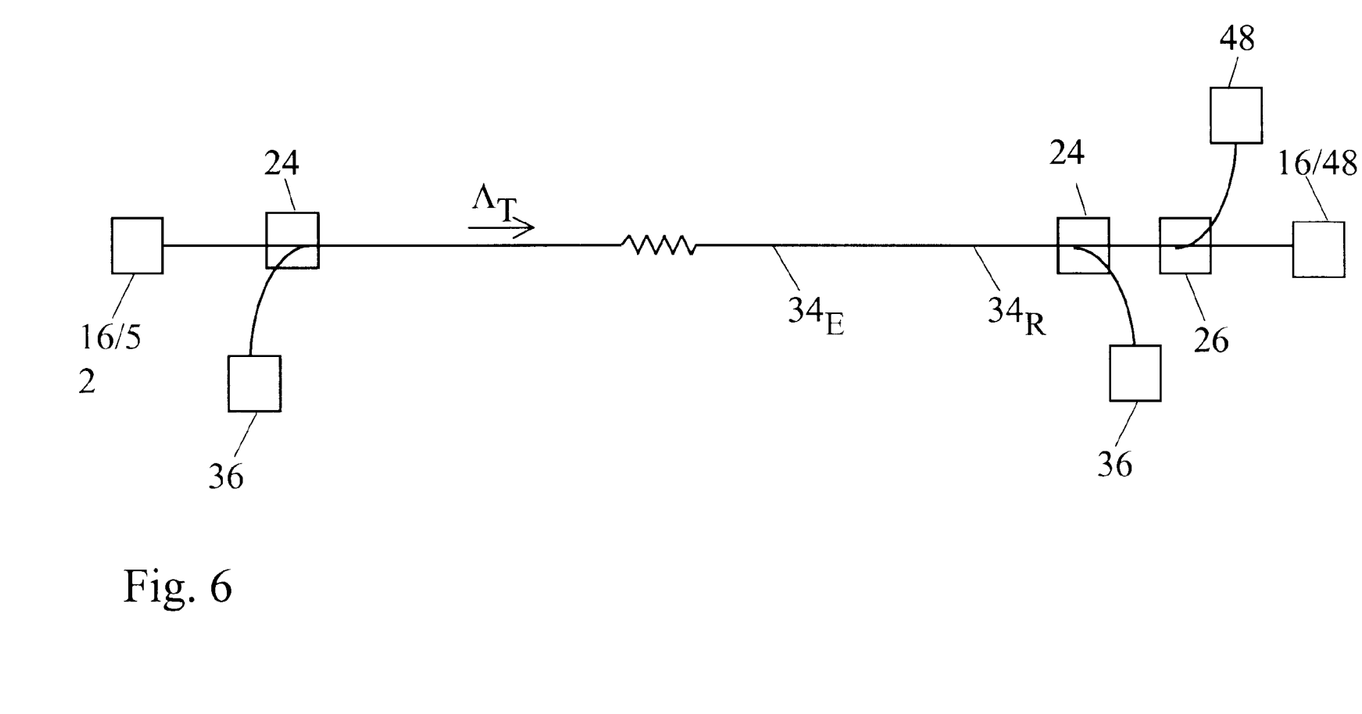

The optical amplifiers 12 generally include an optical amplifying medium 30 supplied with power from an amplifier power source 32 as shown in FIG. 3. For the sake of clarity, the optical amplifier 12 will be generally described in terms of an amplifying fiber 34 supplied with power in the form of optical, or "pump", energy from one or more pump sources 36, as shown in FIGS. 4–6. It will be appreciated that optical amplifiers 12 including other amplifying media 30, i.e., semiconductor, etc., may be substituted with appropriate modification.

The amplifying fiber 34 will generally be a doped and Raman fiber supplied with optical energy in one or more pump wavelengths $\lambda_{pi}$ suitable for amplifying the signal wavelengths $\lambda_i$ passing through the amplifying fiber 34. One or more dopants can be used in the doped amplifying fiber 34, such as Er, other rare earth elements, e.g., Yb and Nd, as well as other dopants. The doped and Raman amplifying fibers 34 can be distributed as part of the transmission fiber 14, or concentrated/lumped at discrete amplifier sites, and can be locally or remotely pumped with optical energy.

The amplifying fiber 34 can have the same or different transmission and amplification characteristics than the transmission fiber 14. For example, dispersion compensating fiber, dispersion shifted fibers, standard single mode fiber and other fiber types can be intermixed as or with the transmission fiber 14 depending upon the system configuration. Thus, the amplifying fiber 34 can serve multiple purposes in the optical system, such as performing dispersion compensation and different levels of amplification of the signal wavelengths $\lambda_i$.

The present invention can be used with various amplifier embodiments. For example, embodiments such as those described in the incorporated U.S. patent application Ser. Nos. 09/119,556 and 09/253,819 can be employed as amplifiers 12 in the present invention.

Pump energy can be supplied to the amplifying fiber 34, either counter-propagating and/or co-propagating with respect to the propagation of the signal wavelengths $\lambda_i$, as shown in FIGS. 4–6. It will be appreciated that in a bi-directional system 10, the pump wavelength $\lambda_{pi}$ will be counter-propagating relative to signal wavelengths $\lambda_i$ in one direction as well as co-propagating relative to signal wavelengths $\lambda_i$ in the other direction.

Figure 7:
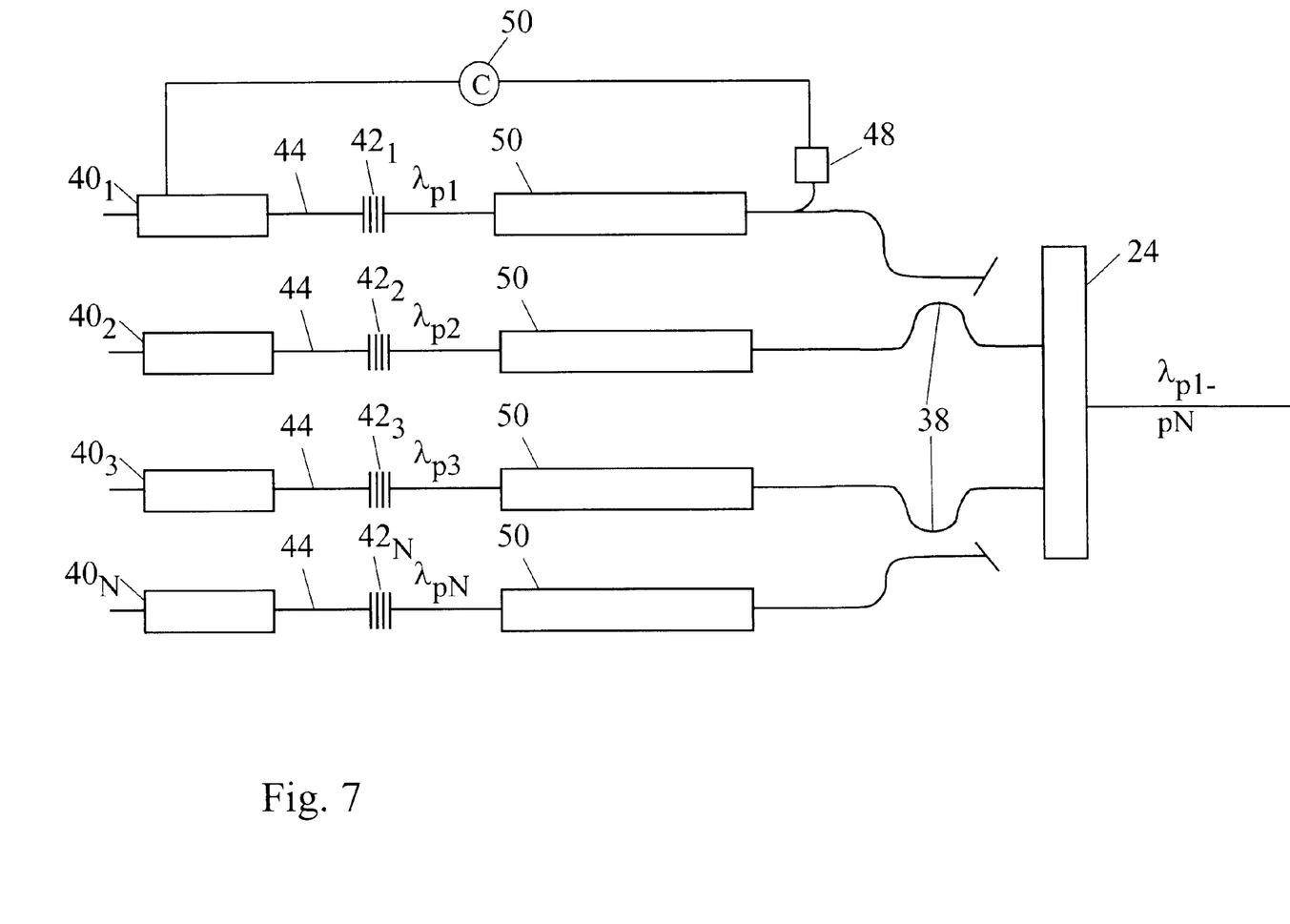
FIG. 7 shows a pump source embodiment.

The pump source 36 can include one or more narrow band or broad band optical sources 40, each providing one or more pump wavelengths $\lambda_{pi}$. The pump wavelengths $\lambda_{pi}$ can be combined using couplers 38 and other combiners 24 before being introduced in the transmission fiber 14 (FIG. 7). The optical sources 40 can include both coherent and incoherent sources that can be wavelength stabilized by providing a Bragg grating 42 or other wavelength selective, reflective element in a pig tail fiber 44 of the source 40. Furthermore, if the optical source 40 provides a polarized beam, the fiber pigtail can be a polarization maintaining fiber and a depolarizer 46 can used to depolarize the pump beam. Also, a portion of the pump power can be tapped to an O/E converter 48 and an optical source controller 50 employed to provide feedback control over the optical source 40.

Following installation of the amplifier 12 into the transmission fiber 14, a test source 52 is used to transmit test power $\Lambda_T$ through the transmission fiber 14 and the optical amplifiers 12. The test source 52 can include one or more broad or narrow band sources. For example, broad band noise sources, such as a pumped erbium doped fiber providing Amplified Spontaneous Emissions ("ASE") can be used (FIG. 5(b)), as well as one or more broad band lasers. Alternatively, one or more narrow band optical source can be used as the test source 52. The narrow band test sources 52 can be dedicated calibration sources or optical transmitters 18 as used in the system 10. In bi-directional transmission systems 10, test power $\Lambda_{T1}$ and $\Lambda_{T2}$ can be introduced in each direction to characterize the amplifier 12 in both directions as shown in FIG. 5(a).

Optical to electrical (O/E) converters 48, can be tapped or temporarily inserted into the fiber 14 following the amplifier 12 to measure the test power $\Lambda_T$ in the signal wavelengths. The O/E converter 48 can be embodied as an optical spectrum analyzer 54, or one or more fixed or tunable optical receivers 56, or other device appropriate to provide power measurements over a signal wavelength range of interest. For example, one or more direct detection photodiodes 58 and associated electronics with fixed or tunable optical filters 60, such as scanning Fabry-Perot or Bragg grating filters, can be used in lieu of the optical spectrum analyzer 54 to perform measurements over the signal wavelength range.

In various embodiments, the O/E converters 48 can be provided following the optical amplifiers 12 as an integral part of the optical system 10 as shown in FIG. 2. The integral O/E converters 48 can be used for signal quality and amplifier performance monitoring and amplifier recalibration during operation and/or maintenance shutdowns, in addition to initial calibration.

A local, amplifier central processor 62 can be provided to oversee amplifier operation, perform signal quality and amplifier performance analyses and calibration tasks. The central processor 62 can locally perform the analyses or merely send the data elsewhere in the network management system 22 for processing. A supervisory transmitter 64 can be used to transmit the signal quality, as well as other system information, to a network management layer of the network management system 22. The central processor 62 can communicate with the network management layer either directly or via one or more nodes 16 in a supervisory channel through the transmission fiber 14.

Optical power measurements of the test power passing through the optical amplifier are taken at various wavelengths as a function of the pump power supplied in each pump wavelength $\lambda_{pi}$. The test power can be provided over the entire signal wavelength range of interest or subsections of the wavelength range. Using a broad band test power source allows pump-pump and pump-signal interactions to be determined over the entire range. Conversely, providing test power over subsections of the wavelength range can be more indicative of the traffic profile in lightly populated systems.

The performance of optically pumped amplifiers 12 depends on a number of amplifier parameters. For example, the gain in a signal wavelength depends on the pump wavelength in which the optical energy is provided to the amplifying medium 30. Furthermore, optical energy in multiple pump wavelengths will tend to interact and the power in each pump wavelength will vary as a result of the interactions. The former of these effects can be characterized by a gain efficiency $\epsilon$ and the latter by a pump interaction parameter $\alpha$.

In this manner, the actual gain $G_i$ for each signal wavelength $\lambda_i$ can be calculated as a function of the gain efficiency $\epsilon_{ij}$ for each signal wavelength i and pump wavelength j and the effective power of the pump wavelength $P_{j,eff}$, in the form:

$$G_i = \sum_{j=1}^{n} \varepsilon_{ij} P_{j,eff} \quad (1)$$

The effective pump power $P_{j,eff}$ of a pump wavelength accounts for the input pump power $P_j$ supplied by the pump source 36 and the power that is gained or lost via interactions with pump power $P_k$ from other pump wavelengths k, which is equal to:

$$P_{j,eff} = P_j \left(1 + \sum_{k=1,k\neq j}^{n} \alpha_{jk} P_k \right) \quad (2)$$

Actual gain measurements can be taken at various pump powers and pump wavelength combinations, which can be used to solve for the gain efficiencies $\epsilon_{ij}$ and the pump interaction parameters $\alpha_{jk}$. The amplifier parameters can then be used to determine the input pump power $P_j$ for each pump wavelength to produce a desired gain profile for the signal wavelength $\lambda_i$.

Initial power measurements of the test power passing through the amplifier can be taken without pump power being supplied to the amplifier. The zero pump power measurement provides a convenient baseline to determine the actual gain in the signal wavelengths as a function of pump power in subsequent measurements. If an optical amplifier acts as an absorber in the unpumped state, then the initial power measurements can be taken before the amplifier or at a low pump power to reduce the absorption of the amplifying medium 30.

The gain efficiencies $\epsilon_{ij}$ can be calculated based on operation of the amplifier 12 with only one pump wavelength at a time, if the influence of other pump wavelengths on the gain efficiencies is assumed to be negligible in the power range of interest. Therefore, test power measurements taken at the signal wavelengths can be used to directly calculate the gain efficiency. Likewise, the test power at the signal wavelengths can also be approximated (extrapolated/interpolated) based on test power measurements at other wavelengths in the range of signal wavelengths.

Additional measurements with various combinations of pump wavelengths and pump powers can be used to calculate the pump interaction parameters $\alpha_{jk}$. Analytic solutions for the interaction parameters $\alpha_{jk}$ can be obtained, if higher order dependencies, such as secondary pump interactions and power dependencies, are not included in the parameter models. However, the complexity of the analytic solution often makes it more practical to numerically solve for the interaction parameters $\alpha_{jk}$. As would be expected, the number of test measurements and the parameter model complexity will affect the accuracy of the numerical solution for the interaction parameters $\alpha_{jk}$.

In RFAs, the gain efficiencies $\epsilon_{ij}$ and interaction parameters $\alpha_{jk}$ can often be assumed to be independent of pump power over the signal wavelength and power ranges of interest. The interaction parameters $\alpha_{jk}$ and gain coefficient $\epsilon_{ij}$ can be then be calculated by making an appropriate number of measurements at two power levels. For example, $2^N$ measurements representative of all on/off combinations of N pump wavelengths at one non-zero pump power level can be used to evaluate the amplifier parameters, $\epsilon_{ij}$ and $\alpha_{jk}$, which characterize the RFA performance. Statistical techniques can be used to reduce the total number of test measurements used in the characterization.

Similarly, when erbium doped fiber is used in the amplifier 12, it may be desirable to include a power dependence in the parameter models depending upon the power range of interest. Likewise, a signal wavelength density dependence can be included in both RFA and EDFA, if needed to improve the parameter fit to the data. As the complexity of the parameter models is increased, the number of measurements and non-zero pump power levels tested will most likely have to be increased depending upon the power range of interest.

The actual gain measurements and input pump powers will be used to calculate a set of amplifier performance parameters specific to a particular span of transmission fiber and amplifier. The amplifier performance parameter calculations can be performed internally or externally to the system 10. The system 10 can internally perform the calculations using the amplifier central processor 62 or the measurements can be sent directly or via the supervisory channel to a network management layer of the network management system 22.

Likewise, the calculated amplifier performance parameters can be stored locally in the amplifier central processor or elsewhere in the network management system 22. In the first scenario, when the gain profile of the amplifier 12 is to be changed, the network management system 22 would either directly or via the supervisory channel send the desired gain profiles to each amplifier in the system 10. The amplifiers 12 would then locally calculate and implement the necessary pump power levels. In the second scenario, the network management system 22 would calculate the pump input power levels necessary to implement a new gain profile for the signal wavelengths and transmit the input pump power levels to the amplifiers. It will be appreciated that the two scenarios can be combined to provide redundancy in case of a failure in the system 10.

In situ, or installed, characterization and control can be performed for both distributed and concentrated amplifiers supplied with optical energy either locally or remotely. However, the present invention is particular useful for distributed and remotely pumped amplifiers. Proper characterization and control of distributed and remote amplifiers, both doped, e.g., erbium, and Raman amplifiers, for use in commercial optical systems had previously been difficult to achieve. The major difficulty lies in the fact that, unlike discretely located, concentrated amplifiers, distributed and remote located amplifiers can not be fully characterized before installation, because of the use of installed transmission fiber in the amplifier 12.

For example, in various embodiments of the present invention, optical amplifier 12 can be configured to provide distributed Raman amplification in the transmission fiber 14

(FIG. 6). The pump power can be supplied in pump wavelength $\lambda_{pi}$ that are counter-propagating and/or co-propagating with respect to the uni-directionally or bi-directionally propagating signal wavelengths $\lambda_i$ in transmission systems 10. As previously described, various optical combiner configurations, such as circulator 66 and grating 42 combinations, as well as dichroic devices 68 can be used, in addition to couplers 38, to combine the signal wavelengths and pump wavelengths in the Raman amplifying fiber $34_R$. For example, dichroic coupler 68 can be used to combine pump power supplied over a broad pump wavelength range from a broad band pump source 36, as well as pluralities of narrow band pump wavelengths combined using configuration shown in FIG. 7.

The embodiments, may also include remotely pumped sections of standard or L-band erbium, or other amplifying fibers $34_i$ having different amplification and transmission characteristics, e.g., dispersion, etc., than the transmission fiber 14. The remotely pumped amplifying fiber $34_i$ can be pumped with excess pump power supplied to provide Raman gain in the transmission fiber 14 or via a separate fiber. In addition, the remote amplifying fiber $34_i$ and distributed Raman amplifiers $34_R$ can be individually or jointly characterized to allow calculation of a composite gain profile for serial amplifier stages.

Analogously, the optical amplifier 12 can also include one or more additional amplifier stages, which may include combinations of one or more, distributed and concentrated amplifier stages that can be characterized individually or in combination as may be appropriate. Likewise, optical signal varying devices, such attenuators and filters, as well as processing devices, such as add/drop devices, etc. can be included in before, between, and after the various amplifier stages.

In practice, the ability to effectively control the in situ performance of one or more amplifier stages provides increased flexibility in tailoring the overall gain profile of the amplifier 12. For example, a distributed Raman amplifier stage can be used in combination with a concentrated, locally pumped Raman amplifier to control the signal wavelength power profile entering an erbium amplifier stage. Both the concentrated Raman and erbium stages can be characterized pre- or post-installation into the system 10.

The ability to control the gain profile also provides the capability to adjust the amplifier performance characteristics during operation. For example, the pump power supplied in each pump wavelength can be varied to account for operational changes, such as signal wavelength population variations, while maintaining a desired gain profile.

The flexibility of optical systems and optical amplifiers of the present invention derives in part, because the optical amplifier is characterized based on its performance as a function of the pump power and not the pump power itself. In other words, the amplifiers are characterized based on the effect of the input pump power and not the actual input pump power. In fact, it is not necessary to know the actual power being provided for signal amplification, only the input pump power required to achieve a desired amount of signal amplification. Therefore, the amplifier performance can be monitored and adjusted as necessary to control the gain profile of the amplifier.

It may be desirable to control all of the optical amplifiers 12 in an optical link between two processing nodes 16 to ensure stable performance of the link. Coarse control of the optical amplifiers along the link can be performed using techniques such as those described in commonly assigned U.S. patent application Ser. No. 09/119,561, which is incorporated herein by reference. Whereas, fine tuning control over the amplifier performance can be locally provided at each amplifier 12.

It will be appreciated that the present invention provides for optical systems having optical amplifiers with improved performance. Those of ordinary skill in the art will further appreciate that numerous modifications and variations that can be made to specific aspects of the present invention without departing from the scope of the present invention. It is intended that the foregoing specification and the following claims cover such modifications and variations.

What is claimed is:

1. A method of amplifying optical signals comprising:
    providing an optical amplifier in an optical transmission fiber including an amplifying fiber configured to receive power as optical energy in a plurality of pump wavelengths;
    characterizing the amplifier performance for optical signals passing through the transmission fiber and amplifying fiber as a function of the optical energy provided in the plurality of pump wavelengths; and,
    supplying optical energy in the plurality of pump wavelengths in an amount based on the characterized amplifier performance to control the amplification of a plurality of signal wavelengths included in the optical signal.

2. The method of claim 1, wherein:
    said providing includes providing a distributed Raman amplifier in which the amplifying fiber includes at least a section of the transmission fiber.

3. The method of claim 1, wherein said providing includes providing a distributed Raman amplifier in which the amplifying fiber includes at least a section of the transmission fiber and at least one section of erbium doped fiber receiving the optical energy.

4. The method of claim 1, wherein said characterizing includes characterizing the gain over a signal wavelength range as a function of the optical energy supplied via the plurality of pump wavelengths.

5. The method of claim 1, wherein said characterizing includes:
    transmitting test power in at least one signal wavelength;
    measuring the gain in the at least one signal wavelength as a function of optical energy supplied via the plurality of pump wavelengths;
    calculating a gain efficiency for each combination of signal wavelength and pump wavelength and a pump interaction parameter for each combination of pump wavelengths.

6. The method of claim 5, wherein said transmitting includes transmitting optical noise in the signal wavelength range as the test power.

7. The method of claim 5, wherein said calculating the gain efficiency includes:
    measuring the power in the at least one signal wavelength when no power is supplied in any of the pump wavelengths and power is only supplied in one of the pump wavelength; and,
    calculating the gain efficiency based on the power in the at least one signal wavelength and the power supplied in the one of the pump wavelengths.

8. The method of claim 1, wherein:
    said supplying includes supplying optical energy in the plurality of pump wavelengths to produce a gain profile over a signal wavelength range based on the characterized optical amplifier performance.

9. The method of claim 1, wherein said supplying includes:

calculating the optical energy to be provided in the plurality of pump wavelengths to produce a gain profile over a signal wavelength range based on the characterized optical amplifier performance; and, supplying the calculated amount of optical energy in the plurality of pump wavelengths to produce the gain profile in the signal wavelength range.

10. A method of calibrating optical amplifier performance comprising:

installing an optical amplifier in an optical transmission fiber;

transmitting test power through the transmission fiber and the optical amplifier;

varying the power supplied to the optical amplifier;

measuring the test power transmitted through the optical amplifier as a function of the power supplied to the optical amplifier; and, calculating amplifier performance parameters based on the measured test powers to characterize the amplification of a plurality of signal wavelengths as a function of the power supplied to the amplifier.

11. The method of claim 1, wherein said characterizing includes characterizing the optical amplifier according to the method of claim 10.

12. The method of claim 2, wherein:

said installing includes installing an optical amplifier including an amplifying fiber supplied with power as optical energy in a plurality of pump wavelengths;

said varying includes varying the optical energy supplied in the plurality of pump wavelengths.

13. The method of claim 12, wherein said calculating includes calculating gain efficiencies of the pump wavelengths for each signal wavelengths and and interaction parameters between the pump wavelengths.

14. The method of claim 12, wherein said transmitting includes transmitting test power as broad band noise spanning at least a portion of a signal wavelength range of interest.

15. The method of claim 12, wherein said transmitting includes transmitting test power as a plurality of narrow band signals spanning at least a signal wavelength range of interest.

16. The method of claim 10, wherein:

said installing includes installing an optical amplifier including a Raman amplifying fiber supplied with power as optical energy in a plurality of pump wavelengths propagating through the Raman fiber in at least one of a counter-propagating and a co-propagating direction relative to the signal wavelength propagation.

17. The method of claim 16, wherein said installing a Raman amplifying fiber includes configuring at least one pump source to propagate the plurality of pump wavelengths through the transmission fiber, wherein the transmission serves as the Raman amplifying fiber to provide distributed Raman gain to the signal wavelengths.

18. The method of claim 17, wherein said installing includes inserting an erbium doped fiber into the transmission fiber; and, said configuring includes configuring the at least one pump source to supply power to the erbium doped fiber.

19. The method of claim 18, wherein said installing includes inserting an erbium doped fiber into the transmission fiber; and, said configuring includes configuring at least one pump source to supply power through the Raman amplifying fiber to the erbium doped fiber.

20. The method of claim 19, wherein said configuring includes configuring a plurality of pump sources to supply power through the Raman amplifying fiber to the erbium doped fiber from opposite directions.

21. The method of claim 16, wherein said configuring includes configuring a plurality of pump sources to supply power through the Raman amplifying fiber in opposite directions.

22. The method of claim 10, wherein:

said varying includes supplying optical energy in statistical combinations of pump wavelengths and power to allow the gain efficiency for each signal wavelength and pump wavelength combination and interaction parameters for the plurality of pump wavelengths to be calculated;

said measuring includes measuring test power in a signal wavelength range for each statistical combination of pump wavelengths and power;

said calculating includes calculating the gain efficiencies and interaction parameters based on the measured test powers.

23. An optical system comprising:

at least one transmitter configured to transmit information via at least one optical signal wavelength through an optical transmission fiber;

at least one receiver configured to receive the at least one signal wavelength from the optical transmission fiber; and, at least one optical amplifier supplied with optical energy in a plurality of pump wavelengths disposed along said fiber to amplify the at least one signal wavelength, wherein the optical energy in each of the pump wavelengths is provided in an amount to control the amplification of a plurality of signal wavelengths included in the optical signal based on amplifier performance parameters calculated from measurements of test power passing through the transmission fiber and optical amplifier as a function of the optical energy supplied in the pump wavelengths.

24. The system of claim 23, wherein the optical energy in each of the pump wavelength is provided to selectively control the amplification of the plurality of signal wavelengths.

* * * * *